United States Patent
Andreani et al.

(10) Patent No.: US 6,451,097 B1
(45) Date of Patent: Sep. 17, 2002

(54) AIR TREATMENT PLANT PROVIDED WITH NOISE ATTENUATION MEANS

(75) Inventors: Philippe Andreani, Le Kremlin Bicetre; Christian Berta, Villiers sur Marne; Thomas Wellnitz, Paris, all of (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/709,630

(22) Filed: Nov. 13, 2000

(30) Foreign Application Priority Data

Nov. 10, 1999 (FR) .............................. 99 14176

(51) Int. Cl.[7] ...................... B01D 53/00; B01D 53/047
(52) U.S. Cl. ........................ 96/380; 96/381; 96/384; 96/385; 96/130; 55/467
(58) Field of Search ................... 96/380, 381, 382, 96/384, 385, 387, 388, 130; 55/467; 95/102, 148

(56) References Cited

U.S. PATENT DOCUMENTS

| | | | | |
|---|---|---|---|---|
| 3,583,686 A | * | 6/1971 | Mackey ..................... 432/62 |
| 3,977,729 A | * | 8/1976 | Olson et al. ................ 406/120 |
| 4,050,913 A | * | 9/1977 | Roach ......................... 96/381 |
| 4,113,051 A | * | 9/1978 | Moller ........................ 96/383 |
| 4,350,506 A | * | 9/1982 | Otto ............................ 96/381 |
| 4,378,982 A |   | 4/1983 | McCombs |
| 4,455,135 A | * | 6/1984 | Bitterly ........................ 432/1 |
| 4,762,540 A | * | 8/1988 | Ruiz et al. ................... 96/388 |
| 5,136,821 A | * | 8/1992 | Child ......................... 181/290 |
| 5,441,558 A | * | 8/1995 | Lee et al. ..................... 95/148 |

FOREIGN PATENT DOCUMENTS

| | | |
|---|---|---|
| EP | 0 250 627 | 1/1988 |
| EP | 0 860 647 | 8/1998 |
| FR | 2 563 559 | 10/1985 |
| JP | 58 119321 | 7/1983 |
| JP | 62 140619 | 6/1987 |
| JP | 07 275632 | 10/1995 |

* cited by examiner

Primary Examiner—Duane Smith
Assistant Examiner—Jason M. Greene
(74) Attorney, Agent, or Firm—Young & Thompson

(57) ABSTRACT

An air treatment plant includes a waste gas vent connected to structure (50) for attenuating the noise conducted by this waste gas. The noise attenuation structure (50) is a substantially closed and at least partially buried enclosure (52). The invention applies especially to plants for separating air by pressure swing adsorption.

18 Claims, 2 Drawing Sheets

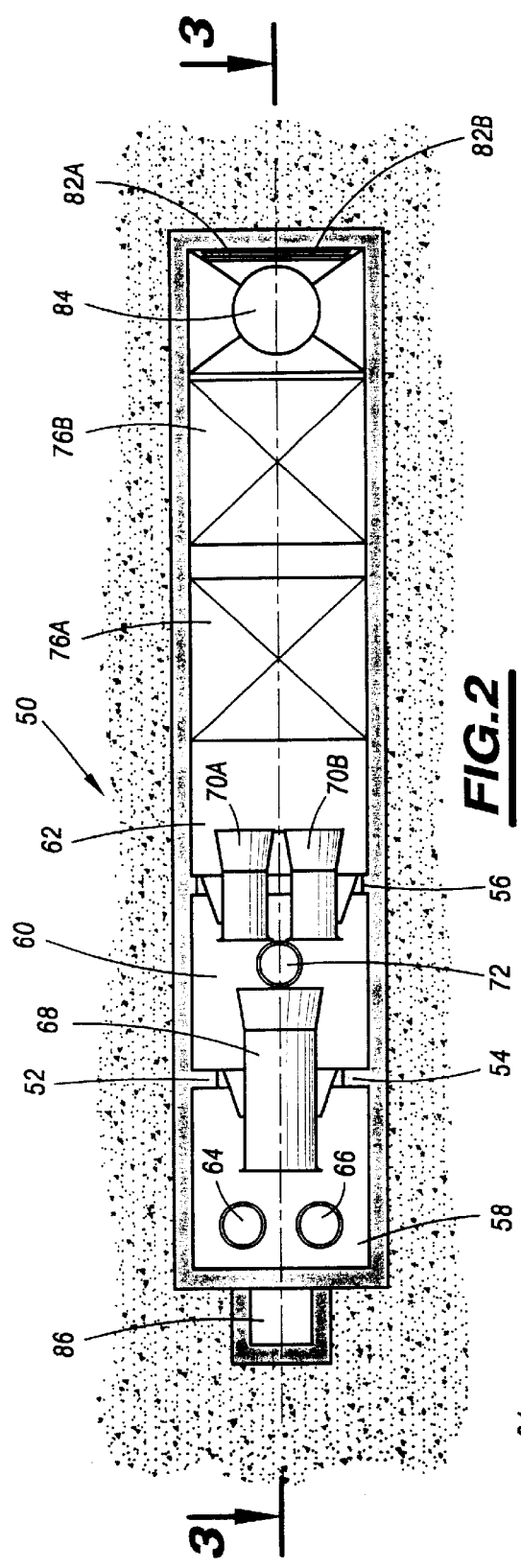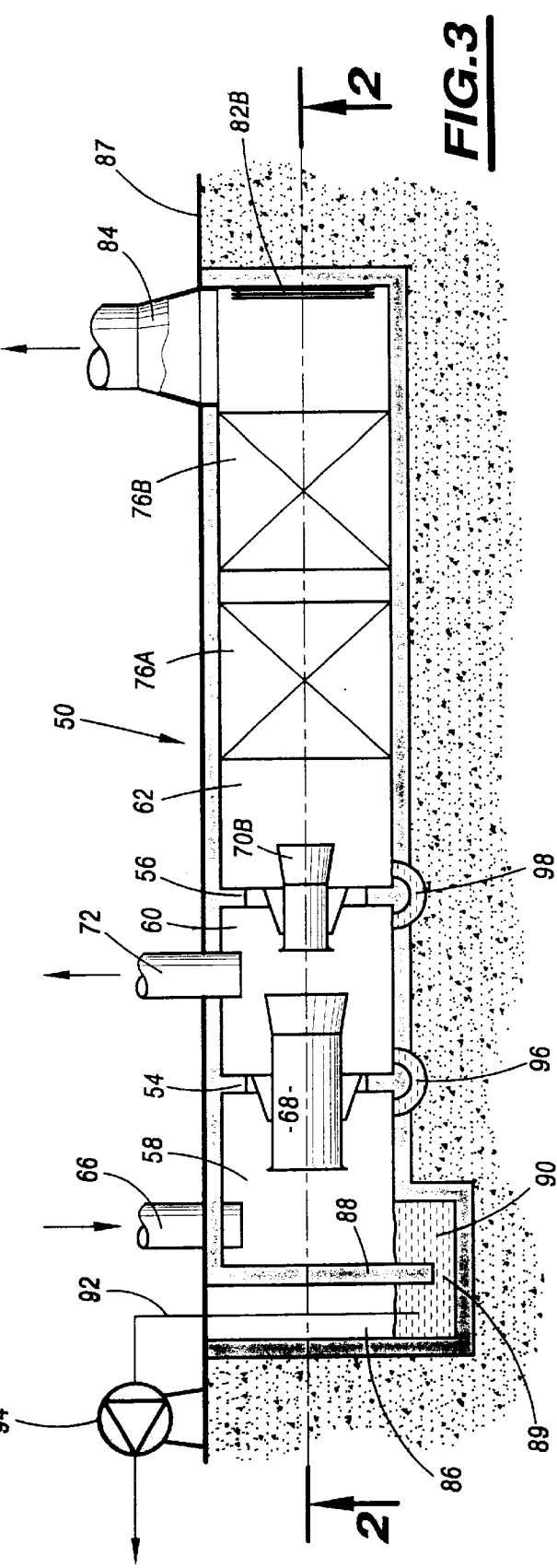

AIR TREATMENT PLANT PROVIDED WITH NOISE ATTENUATION MEANS

The present invention relates to an air treatment plant of the type including at least one waste gas vent connected to means for attenuating the noise conducted by this waste gas.

The invention applies especially to plants for producing a gas from air, typically oxygen by adsorption from air, particularly of the VSA (vacuum swing adsorption or vacuum-type pressure swing adsorption).

Such plants generally comprise at least one adsorption container and an air compressor connected by its delivery side to a first side (inlet) of the adsorption container via a feed line. Connected to the second side (outlet) of the adsorption container are a production line leading to the user site and an elution/repressurization line. A vacuum pump, generally a vacuum pump of the wet or dry Roots type, is connected to the first side of the adsorption container. All the components may be individually connected to the adsorption container and isolated therefrom by valves. The operation of such plants comprises a cycle with essentially three phases:

- during the active or production phase, which generally takes place in the region of atmospheric pressure, the compressor draws in air from the environment and introduces it into the adsorber, where a first part of the constituents of air, essentially nitrogen, is adsorbed and a second part, especially oxygen, is recovered at the outlet of the adsorber as useful gas and then passes into the reservoir;
- during a second phase or regeneration phase, the introduction of air into the adsorber is stopped. Thereafter, the adsorber is emptied of the nitrogen, firstly by applying a vacuum using the vacuum pump and secondly by purging at low pressure by means of the oxygen produced during the active phase (elution). The vacuum pump draws gas into the adsorber and discharges it via a silencer into the atmosphere;
- during a third phase or repressurization phase, the adsorber is repressurized with oxygen.

In order to reduce the sound level of the gas delivered by a vacuum pump of a VSA plant, use is made, in the prior art, of a silencer in the air. Such a silencer generally comprises a sheet-metal shell having several parts. Reactive-type noise attenuation means (for example impedance tubes) and absorptive-type noise attenuation means (for example baffles) are provided, in succession, in this order, from the inlet to the outlet inside the various parts. Active-type noise attenuation means (for example, driven loudspeakers producing antinoise) may supplement or at least partly replace the reactive or absorptive systems.

In general, these silencers do not make it possible to achieve sufficiently low noise levels, especially when there are Roots-type vacuum pumps used which have a frequency spectrum difficult to attenuate because of a high proportion of low frequencies. In addition, the silencers are very bulky and their sheet-metal body radiates noise during operation. Moreover, such silencers are very expensive.

There are a great number of variants of plants for separating gases by pressure swing adsorption.

Two (non-limiting) examples of such plants are described in documents U.S. Pat. No. 5,223,004 and EP 0 598 321.

The object of the invention is to overcome the drawbacks explained above and to provide a silencer for an industrial plant of the aforementioned type which provides increased noise attenuation, is reduced in cost and is not very bulky.

For this purpose, the subject of the invention is a plant of the aforementioned type, characterized in that the noise attenuation means comprise a substantially closed and at least partially buried enclosure.

Depending on the particular embodiments, the invention may include one or more of the following characteristics:

- the enclosure is completely buried;
- at least part of the plant is placed above the said enclosure;
- the plant includes at least one other vent connected to the said noise attenuation means;
- the said noise attenuation means include, in succession, from a gas inlet to a gas outlet, reactive noise attenuation means and absorptive noise attenuation means;
- the said reactive noise attenuation means comprise two reactive noise attenuation members in series;
- the reactive noise attenuation means comprise impedance tubes;
- the plant includes at least one vacuum pump, especially intended to deliver the waste gas, the delivery side of which is connected to the said noise attenuation means;
- the plant includes means for connecting the suction side of the vacuum pump to the said noise attenuation means, for operation of the vacuum pump on itself;
- the plant includes means for connecting the suction side of the vacuum pump to the said noise attenuation means downstream of the first reactive noise attenuation member and upstream of the second reactive noise attenuation member, while the delivery side of the vacuum pump is connected to the said reactive noise attenuation means upstream of the first reactive noise attenuation member;
- the vacuum pump is a wet or dry Roots vacuum pump;
- the enclosure is manufactured from concrete, masonry or the like;
- the enclosure includes a gas exhaust duct, especially made of concrete, masonry or the like;
- the duct includes additional noise attenuation means, especially of the absorptive or active type;
- the enclosure includes water collection and extraction means;
- the plant is an industrial plant for separating gases from air by pressure swing adsorption, typically for the production of oxygen from air; and
- the enclosure comprises heat recovery means in order to bring the waste gas into heat exchange relationship with the incoming air.

BRIEF DESCRIPTION OF THE DRAWINGS

The invention will be more clearly understood upon reading the description which follows, given solely by way of example and with reference to the appended drawings in which:

FIG. 2 is a view of the silencer from below and in longitudinal section on the line 2—2 in FIG. 3;

FIG. 3 is a longitudinal section of the silencer on the line 3—3 in FIG. 2.

Figure 1:
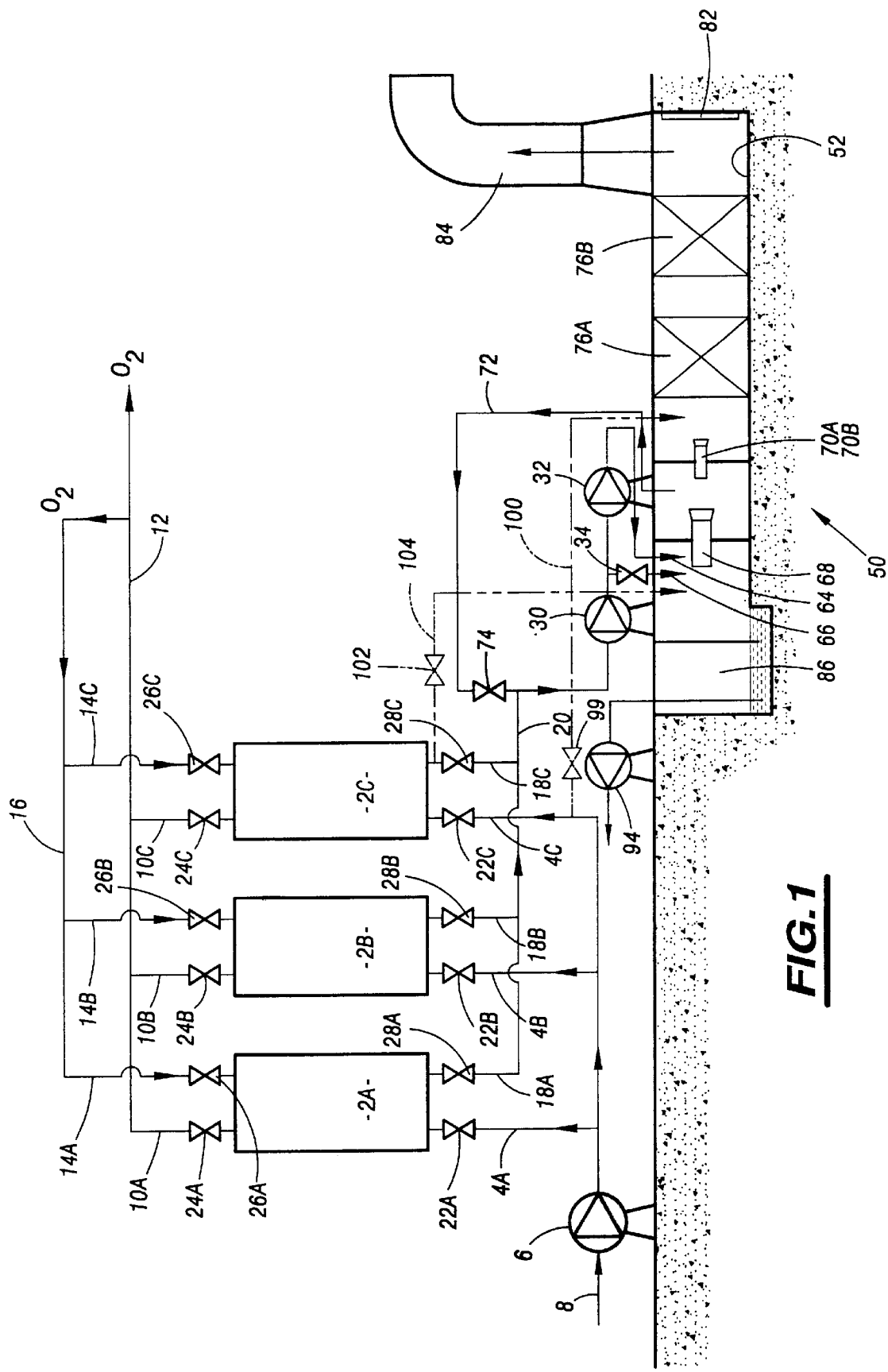
FIG. 1 is a schematic view of one embodiment of a VSA plant for producing oxygen, according to the invention.

The particular plant shown in FIG. 1 comprises three identical adsorbers 2A, 2B, 2C. Each adsorber is connected via its lower end to an air feed line 4A, 4B, 4C coming from the delivery side of a Roots-type or centrifugal compressor 6. The suction side of the compressor 6 is connected to a line 8 open to the surrounding atmosphere.

On each adsorber 2A, 2B, 2C there is a connection 10A, 10B, 10C to a production line 12 leading to the user site.

Each adsorber 2A, 2B, 2C also has a connection 14A, 14B, 14C to an elution/repressurization line 16 through which part of the oxygen from the production line 12 flows. Each of the adsorbers 2A, 2B, 2C is connected via a connection 18A, 18B, 18C to a discharge line 20. Connected to each of the adsorbers are four valves, namely a feed valve 22A, 22B, 22C, a production valve 24A, 24B, 24C, an elution/repressurization valve 26A, 26B, 26C and a discharge valve 28A, 28B, 28C. By means of these valves, the connection of the adsorbers 2A, 2B, 2C to the aforementioned lines may be established and interrupted individually.

In the embodiment shown, the discharge line 20 leads to the suction side of a first Roots vacuum pump 30. The delivery side of this first vacuum pump 30 is connected to a sheet-metal component which leads firstly to the suction side of a second Roots vacuum pump 32 and secondly, through a valve 34, to the inlet of a buried silencer generally denoted by the reference 50. This silencer 50 is substantially closed, that is to say it has a closed structure apart from the gas inlet and outlet openings. The expression "buried" means in this context that the silencer is at least partly covered, on its side walls, and possibly on its upper wall, by earth or a similar material. The delivery side of the second vacuum pump 32 is also connected to the inlet of the buried silencer 50. The pumps may especially have two or three lobes.

In order to reduce the size, at least some of the components of the plant are advantageously placed directly above the buried silencer 50. In particular in the embodiment shown, the vacuum pumps are placed above the silencer.

The buried silencer 50, typically placed in a trench cut in the ground, essentially comprises an enclosure 52 advantageously made of reinforced concrete (FIGS. 2 and 3), typically with a horizontally elongate shape, divided, for example, by two transverse partitions 54, 56 into three successive chambers. As a variant, the enclosure 52 may be made of masonry, dense blocks or any other suitable material.

Two connections 64, 66 coming from the two vacuum pumps 30, 32 are provided at the top of the first chamber 58. Reactive-type noise attenuation means are advantageously placed in the two partitions 54, 56. Thus, a large impedance tube 68 is mounted in a rectangular opening provided in the first partition 54 which separates the first chamber 58 from the second chamber 60 and two small impedance tubes 70A, 70B, mounted on a plate, are placed in rectangular openings in the partition 56 separating the second chamber 60 from the third chamber 62. A suction line 72 leads from the top of the second chamber 60 (FIG. 1), via a shut-off valve 74 (FIG. 1), to the discharge line 20 leading to the suction side of the first vacuum pump 30, for operation of the vacuum pumps on themselves. The third chamber 62 typically includes absorptive-type noise attenuation means comprising, for example, baffles supported by two successive frames 76A, 76B placed in the chamber 62.

Two soundproofing wall baffles 82A, 82B are placed vertically on the downstream wall of the third chamber 62 in order to prevent reflection of the sound waves. A duct 84, for example made of galvanized sheet metal, is mounted on the top of the third chamber 62, at the opposite end to the impedance tubes 70A, 70B, in order to discharge the exhaust gases at the right height.

A water well 86 is advantageously provided outside the enclosure 52 and it extends from the surface of the ground 87 down to below the bottom wall of the concrete enclosure 52. The well 86 has, beneath one of the walls, which here is the upstream wall 88 of this enclosure, an opening 89 for communication with a sump 90 provided in the bottom of the first chamber 58. A discharge line 92 immersed in the well 86 leads to a water pump 94 which is intended to extract water from this well 86. It should be noted that the inlet of this line 92 lies above the communication opening 89 so that the latter is always immersed in order to ensure acoustic isolation between the first chamber 58 and the well 86. Two channels 96, 98 of U cross section are provided transversely below the two partitions, respectively, so as to allow any water in the second chamber 60 and third chamber 62 to be discharged into the reservoir 90 via longitudinal channels or pipes not shown in the drawings. To facilitate the discharge of the water through these channels 96 and 98 and the associated longitudinal channels and pipes, the bottom of the buried silencer advantageously has a slight slope.

It should be noted that the extraction of the water from the well 86 may be accomplished by any other suitable means, for example by pumps, especially submersible pumps (for example two pumps in parallel) connected to pipes for discharging the water.

The plant operates in the following manner.

During the VSA cycle, which may be any known cycle, the vacuum pumps deliver waste gas at atmospheric pressure and the various valves are operated in order to make the desired connections to the three adsorbers.

The gas delivered by the vacuum pumps 30, 32 conducts a certain amount of noise. This gas is introduced via one or both of the connectors 64, 66 into the first chamber 58. Next, this gas is forced to flow through the large impedance tube 68, thereby creating a phase shift in the sound waves and thus reducing the low-frequency noise. The gas flows from the second chamber 60 towards the third chamber 62 through the two small impedance tubes 70A, 70B, thereby also reducing the low-frequency noise. The two small impedance tubes 70A, 70B provided in the partition 56 distribute in a substantially homogeneous manner the flow over the baffles 76A, 76B of the third chamber 62 and increase the acoustic efficiency of the latter. The gas then flows through the two series of baffles 76A, 76B where the noise is absorbed (especially the medium and high frequencies). The sound waves are prevented from reflecting off the end wall by virtue of the two baffles 82A, 82B placed on the latter. The gas is discharged upwards through the duct 84.

It should be noted that the duct 84 must be high enough to prevent a risk of nitrogen asphyxia in the environment. The duct 84 typically has a height of approximately 6 m.

As a variant, the duct 84 may also be made of concrete, masonry or the like and/or may also be provided with additional noise attenuation means, especially active means (loudspeakers emitting antinoise) which treat the low and very low frequencies.

The gas delivered by the vacuum pumps 30, 32 may contain water, especially cooling water when the vacuum pumps are of the water-injection type. The water introduced via the gas delivered by the vacuum pumps 30, 32 is collected in the reservoir 90 provided in the ground in the first chamber 58. The vacuum pump 94 extracts this water from the reservoir 90 via the well 86.

If the VSA cycle comprises steps in which the vacuum pumps operate on themselves, the vacuum pumps 30, 32 suck out the gas from the second chamber 62 via the line 72, which has the effect that the suction noise is attenuated by the same silencer as the delivery noise. Thus, it is possible to dispense with a separate suction silencer.

It should be noted that, as a variant, as illustrated in FIG. 1 by the dot-dash lines, other means for venting the plant may be connected to this buried enclosure, for example the venting of the delivery side of the Roots or centrifugal air compressor 6, via a valve 99 and a line 100, or expansion valves such as 102, via a line 104, for venting the adsorbers in the case of a pressurized production cycle.

The use of a buried enclosure 52 makes it possible to substantially reduce the radiation from the silencer compared with a sheet-metal silencer in the air. The noise attenuation components may have larger dimensions and be thicker, thereby making it possible to reduce noise even more. Thus, it is possible to dispense with the use of active noise attenuation means, which are not very effective in the case of large flow rates.

The burying of the silencer has the additional advantage that the space taken up by the silencer on the ground is virtually zero. The cost of such a silencer is not very high and the possibility of connecting several vents to it leads to an overall lower installation cost.

It should be noted that the pressure drop across such a silencer, of large cross section, is about 10 mbar, which is less than the pressure drop across a conventional silencer. In this regard, the cross section of the silencer is determined by the output of the vacuum pumps and the length of the chambers is determined by the speed of rotation of these pumps.

In a variant (not shown in the drawings), the buried enclosure may contain heat recovery means, for example a heat exchanger which extends across the cross section of the enclosure, so as to recover some of the output energy of the pumped gas. By virtue of the space available inside the enclosure and of the small pressure drops, it is easier to recover the heat compared with a sheet-metal silencer in the air. The recovered heat can be used, for example, to heat the air drawn in by the suction line 8 when the ambient temperature is below the temperature needed by the separation process.

The silencer described above is an example of one embodiment. The number, type and arrangement of the noise attenuation means may be modified depending on the intensity of the noise and on its spectrum. Of course, the application of such a silencer is not limited to a plant having two vacuum pumps and three adsorbers. The number and the arrangement of the vacuum pumps, for example vacuum pumps in parallel, and of the adsorbers may vary.

What is claimed is:

1. Plant for treating a flux of air for producing a product gas in a product line and waste gas evacuated through at least one waste gas venting circuit, wherein said venting circuit is provided with noise attenuation means for attenuating the noise conducted by this waste gas, said noise attenuation means comprising a substantially closed and at least partially buried enclosure.

2. Plant according to claim 1, wherein the enclosure is completely buried.

3. Plant according to claim 1, wherein at least part of the plant is placed above the said enclosure.

4. Plant according to claim 1, wherein the plant includes at least one other vent connected to said noise attenuation means.

5. Plant according to claim 1, wherein said noise attenuation means include, in succession, from a gas inlet to a gas outlet, reactive noise attenuation means and absorptive noise attenuation means.

6. Plant according to claim 5, wherein said reactive noise attenuation means comprise two reactive noise attenuation members in series.

7. Plant according to claim 5, wherein the reactive noise attenuation means comprise impedance tubes.

8. Plant according to claim 1, which includes at least one vacuum pump to deliver the waste gas, the delivery side of which is connected to the said noise attenuation means.

9. Plant according to claim 8, which further includes means for connecting the suction side of the vacuum pump to said noise attenuation means, for operation of the vacuum pump on itself.

10. Plant according to claim 8, further including means for connecting the suction side of the vacuum pump to said noise attenuation means downstream of the first reactive noise attenuation member and upstream of the second reactive noise attenuation member, while the delivery side of the vacuum pump is connected to said reactive noise attenuation means upstream of the first reactive noise attenuation member.

11. Plant according to claim 8, wherein the vacuum pump is a wet or dry Roots vacuum pump.

12. Plant according to claim 1, wherein the enclosure is manufactured from concrete or masonry.

13. Plant according to claim 12, wherein the enclosure includes a gas exhaust duct made of concrete or masonry.

14. Plant according to claim 1, wherein the duct includes additional absorption or reaction noise attenuation means.

15. Plant according to claim 1, wherein the enclosure includes water collection and extraction means.

16. Air treatment plant, including at least one waste gas venting circuit linked to means for attenuating the noise conducted by this waste gas, the noise attenuation means comprising a substantially closed and at least partially buried enclosure, wherein the plant is a plant for separating gases from air by pressure swing adsorption.

17. Air treatment plant, including at least one waste gas venting circuit linked to means for attenuating the noise conducted by this waste gas, the noise attenuation means comprising a substantially closed and at least partially buried enclosure, wherein the enclosure comprises heat recovery means in order to bring the waste gas into heat exchange relationship with the incoming air.

18. Air treatment plant, including at least one waste gas venting circuit linked to means for attenuating the noise conducted by this waste gas, the noise attenuation means comprising a substantially closed and at least partially buried enclosure, which includes at least one vacuum pump to deliver the waste gas, the delivery side of which is connected to the said noise attenuation means.

* * * * *